US007882026B1

(12) United States Patent
Zettner

(10) Patent No.: US 7,882,026 B1
(45) Date of Patent: Feb. 1, 2011

(54) SYSTEMS AND METHODS FOR A FLAT INTERCHANGE FEE FOR HIGH VALUE CREDIT CARD PURCHASES

(75) Inventor: Steven Dale Zettner, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 224 days.

(21) Appl. No.: 11/782,898

(22) Filed: Jul. 25, 2007

(51) Int. Cl.
*G06Q 40/00* (2006.01)
(52) U.S. Cl. ........................................................ 705/38
(58) Field of Classification Search ........................ None
See application file for complete search history.

(56) References Cited

U.S. PATENT DOCUMENTS

| 7,624,068 | B1 | 11/2009 | Heasley et al. |
| 7,676,409 | B1 | 3/2010 | Ahmad |
| 2002/0069176 | A1 | 6/2002 | Newman |
| 2002/0170959 | A1 | 11/2002 | Madani |
| 2004/0088238 | A1 | 5/2004 | Gilson et al. |
| 2005/0027648 | A1 | 2/2005 | Knowles et al. |
| 2005/0049963 | A1 | 3/2005 | Barry |
| 2005/0085931 | A1 | 4/2005 | Willeby |
| 2006/0116955 | A1 | 6/2006 | Strayer et al. |
| 2006/0136315 | A1 | 6/2006 | Muthiki et al. |
| 2007/0051794 | A1 | 3/2007 | Glanz et al. ................. 235/379 |
| 2007/0208671 | A1 | 9/2007 | Brown et al. |

OTHER PUBLICATIONS

Bosworth, M.H., "MasterCard Offers Concessions in Interchange Fee Battle," *ConsumerAffairs.Com Inc.*, http://www.consumeraffairs.com/printme.php?url=/news04/2006/09/mastercard_fees.html, Sep. 6, 2006, downloaded Jul. 16, 2007, 3 pages.
Shearman, J.C., "Retailers Urge State Efforts on $36 Billion Credit Card Fee," *National Retail Federation: The Voice of Retail Worldwide*, http://www.nrf.com/modules.php?name=News&sp_id=270&op=printfriendly&txt=Nation, 2006, downloaded Jul. 16, 2007, 3 pages.
Visa, "Visa U.S.A. Interchange Reimbursement Fees," Apr. 2006, 5 pages.
"MasterCard Announces Interchange Initiatives Aimed At Maximizing The Value of MasterCard Card Acceptance; Includes Publication of U.S. Interchange Rate Schedule and a Cap on Interchange Fees of Fuel Purchases At Petroleum Retailers," Sep. 5, 2006, Business Wire, 2 pgs.

*Primary Examiner*—John W Hayes
*Assistant Examiner*—George Chen
(74) *Attorney, Agent, or Firm*—Perkins Coie LLP

(57) ABSTRACT

A maximum interchange fee is described herein. Calculating an interchange fee to be assessed may include receiving a purchase amount, determining if the purchase amount exceeds a set level, and if the purchase amount exceeds a set level, capping the interchange fee assessed at a maximum level. Calculating an interchange fee may include determining a maximum fee to be assessed, establishing a rate of reduction for the interchange fee so that the fee assessed does not exceed the maximum amount, receiving the purchase amount, and determining the interchange fee based upon the purchase amount and the rate of reduction. Providing for a capped interchange fee may include determining a maximum interchange fee, receiving a purchase amount, calculating an interchange fee, determining if the interchange fee calculated exceeds the maximum interchange fee, and notifying the merchant that the interchange fee exceeds the maximum amount.

21 Claims, 5 Drawing Sheets

US 7,882,026 B1

SYSTEMS AND METHODS FOR A FLAT INTERCHANGE FEE FOR HIGH VALUE CREDIT CARD PURCHASES

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007, USAA.

CROSS-REFERENCE TO RELATED APPLICATIONS

This application is related by subject matter to the subject matter disclosed in the following commonly assigned applications, the entirety of which are hereby incorporated by reference herein: U.S. patent application Ser. No. 11/782,826, and U.S. patent application Ser. No. 11/782,970, each filed on Jul. 25, 2007 and each entitled "Systems and Methods for a Flat Interchange Fee For High Value Credit Card Purchases."

BACKGROUND

According to Federal Reserve studies, from the early 2000s until the present, consumers have made more payments through the use of electronic forms of payment than check. Electronic forms of payment include credit and debit card purchases. Consumers are less likely to carry checks and are more likely to make payments using electronic methods. Point-of-sale devices that accept electronic payments are becoming more prevalent and are typically expected to be available to the consumer in most businesses. Additionally, as the use of the Internet increases, where electronic forms of payment are typically the standard method of payment, with checks being the exception, consumers are relying upon electronic forms of payment in ever increasing amounts.

When making payment using electronic methods, networks that process the payment typically charge a fee to recoup the cost of providing the network. This fee is typically called the interchange fee, and is assessed by the bank of the credit card issuer to the bank of the merchant. The fees, as assessed by the banks of the credit card issuer, are to cover the costs of converting the charge on the card to a cash deposit at the merchant's bank. The fees may also include billing services, fraud protection as well as to provide for a profit margin. Although the calculation of the interchange fees varies among card issuers, one of the primary factors in the equation to determine the interchange fee is a percentage of the purchase as well as the rate of credit card use by the merchant.

For example, a credit card issuer may set an interchange fee of 4% for credit card purchases. The credit card issuer may systematically reduce that percentage if the merchant has a high rate of usage of credit cards. Thus, for example, a profitable online merchant that only accepts credit card payments may have their interchange fee reduced from the exemplary 4% to 3%, or even further if the usage increases. A disadvantage of this is that some merchants may be hesitant to allow credit card purchases because of the typically low use of credit cards in their stores, and may be even more hesitant if the typical purchase amount by the consumer at the merchant is especially high, as the interchange fee is assessed on the merchant, not the consumer.

For example, credit cards are typically not used as payment for a car because the number of cars sold in a typical lot may be only two or three cars per day on average whereas the average cost of each car may be over $10,000. Thus, if a reduced interchange fee rate was not reduced for the merchant for a $10,000 purchase, the interchange fee may be $400. Because the interchange fee is typically assessed on the merchant rather than the consumer, if the card dealership wishes to take credit cards as a form of payment, to make the same profit the dealership may need to increase the selling price of the car, potentially placing the dealer out of competition.

SUMMARY

An interchange fee is provided whereby the fee is capped at a certain amount for purchases above a certain level. In one exemplary and non-limiting example, calculating an interchange fee to be assessed may include receiving a purchase amount, determining if the purchase amount exceeds a set level, and if the purchase amount exceeds a set level, capping the interchange fee assessed at a maximum level. In another exemplary and non-limiting example, calculating an interchange fee may be to determine a maximum fee to be assessed, establishing a rate of reduction for the interchange fee so that the fee assessed does not exceed the maximum amount, receiving the purchase amount, and determining the interchange fee based upon the purchase amount and the rate of reduction. In another exemplary and non-limiting example, providing for a capped interchange fee may include determining a maximum interchange fee, receiving a purchase amount, calculating an interchange fee, determining if the interchange fee calculated exceeds the maximum interchange fee, notifying the merchant that the interchange fee exceeds the maximum amount.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION

Figure 1:
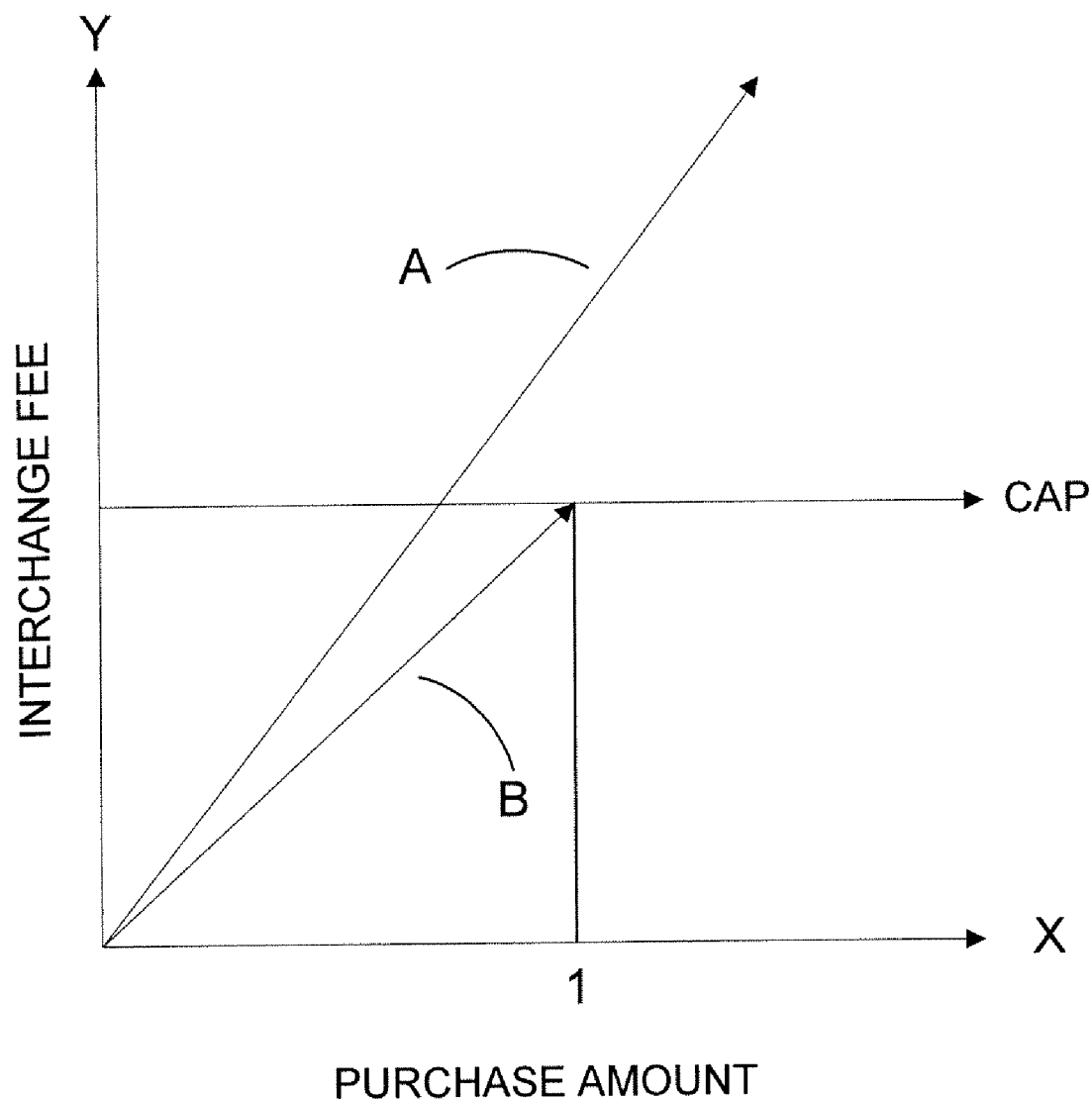
FIG. 1 is a graphical representation of an exemplary and non-limiting way of capping an interchange fee.

The subject matter of the described embodiments is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described. Finally, the communication configuration between computing resources in the following figures are meant to be only illustrative.

Overview of Credit Card Processing

A credit card account is an account linked to a credit card that allows the user to make purchases using the credit card up to, and sometimes over, a credit limit. The user typically pays a percentage of the credit used for that month, taking interest into account if applicable. The processing of a credit card transaction among various credit card networks typically follows the same steps. A merchant, i.e. a store, swipes the card after making a sale, the card number, the amount of the sale, and the store's identification is sent to a processing network host or an application service provider (ASP). The ASP sends the information to the credit card network of the particular card. The credit card network then sends the transaction information to the financial institution, typically a bank, which issued the card.

Upon receiving the transaction information, the bank will check to see if there is sufficient credit in the account to meet the amount of the sale. If there is enough credit, the bank sends a message, called an authorization, to the merchant back through the networks indicating that the transaction is authorized. The merchant receives the authorization and completes the sale.

To transfer funds to pay the merchant, typically at the end of the business day, the merchant will send the current day's charges to the credit card network. The individual charges are sent to the banks for processing, wherein the banks will draw off the charge account, or debit the account, and send the funds electronically to the merchant's ASP, typically through the Federal Reserves' Automated Clearing House. The ASP then sends the funds to the merchant's account. To recoup the cost associated with the transfer of funds from the issuing bank to the merchant's bank, an interchange fee is assessed.

The calculation of the interchange fee varies from issuing bank to issuing bank, though some factors are typically used. The factors that are used by most issuing banks include the amount of the purchase, the costs of converting the charge on the card to a cash deposit at the merchant's bank, billing services, fraud protection, as well as to provide for a profit margin. The issuing bank takes these factors into account and typically assigns a rate to be charged based upon a purchase amount and the number of electronic purchases received for a particular merchant. Although the calculation of the interchange fee may vary between issuing banks, the present subject matter is directed to setting a maximum value of the interchange fee in any method of interchange fee calculation.

FIG. 1 is a graphical representation of an exemplary and non-limiting way to cap an interchange fee. For the purpose of the following description, the purchase amount is used as the only input into the interchange fee calculation, though as discussed above, issuing banks often use additional inputs such as the rate of electronic payments made through the merchant. The present disclosure is not limited to the use of the purchase amount as the only factor, but instead, may be used in various calculation methods whereby a maximum fee to be assessed is desired. Axis "X" represents the purchase amount and axis "Y" represents the interchange fee assessed. Line A represents one way that an interchange fee may be assessed without placing a maximum amount on the interchange fee. As the purchase amount increases, shown by moving from left to right on the X axis, the interchange fee increases, in an amount represented by Line A.

An issuer may wish to establish a maximum interchange fee so that purchase amounts that generate an interchange fee above the maximum will only be assessed the maximum value. The maximum level may be determined either by the issuer or through a request by the merchant, or both. For example, a merchant may negotiate with the issuer to set a maximum level if a certain number of credit card transactions are processed per day. The merchant may also negotiate with the issuer to set a maximum level depending upon a certain expected minimum amount of purchases made per month. The issuer may also set the maximum level as a temporary or permanent incentive to, among other things, drive business to the issuer.

The merchant may also wish to cap interchange fees for particular goods or services. For example, goods or services that are emergency related or necessities may be candidates for flat interchange fees because of the nature of the goods or services. An example of an emergency or necessary good or service is a premium for an insurance claim on a burned down house. Thus, the issuer may assist consumers by instituting a cap on interchange fees under certain conditions. Another example may be the purchase of a car. An automobile is typically a necessity in the modern age. By capping the interchange fee on the purchase of automobiles, the methods of payment available for the consumers are increased, as car dealers may be less hesitant to accept credit cards as a means for purchasing the automobile if the interchange fee was capped at a certain level.

Line B illustrates an interchange fee increase up to a maximum amount, or cap, as shown by line "CAP." The interchange fee increases at a set rate as the amount of the purchase increases. Once the interchange fee increases to the interchange fee amount represented by the line "CAP," any further increase in the purchase amount will not result in an increase in the interchange fee. The interchange fee has been capped at a predetermined amount and will not increase as the purchase price increases beyond amount "1" on the X axis.

Figure 2:
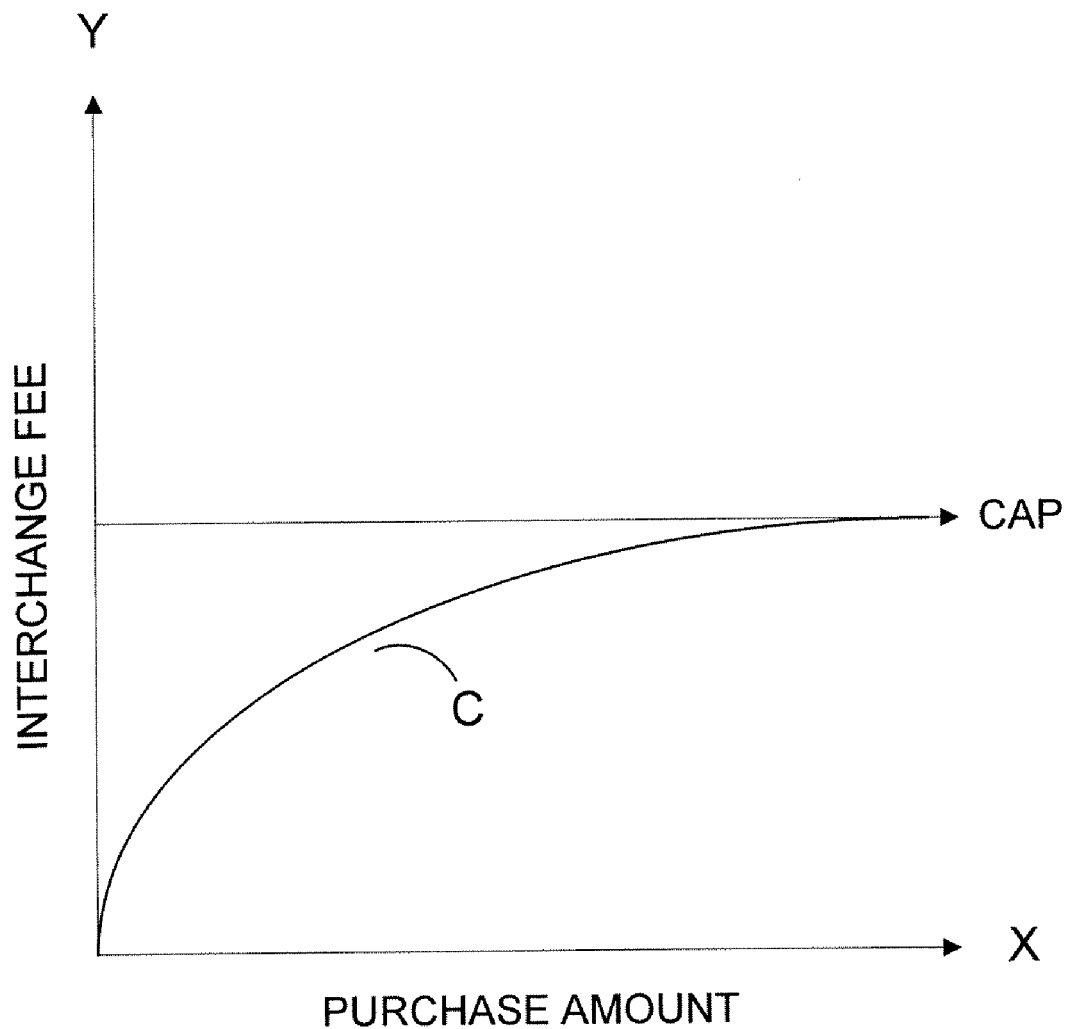
FIG. 2 is a graphical representation of another exemplary and non-limiting way to cap an interchange fee.

FIG. 2 is a graphical representation of another exemplary and non-limiting way to cap the interchange fee. Shown are the X-axis representing the purchase amount and the Y-axis representing the interchange fee. Also shown is inverted curve "C." As the purchase amount increases along the X-axis, the interchange fee calculated increases along curve "C." the slope of Curve "C" decreases at an exponential rate to approach the maximum interchange fee amount, shown by the line "CAP." In some embodiments, curve "C" approaches but does not intersect line "CAP," thus allowing for a slight increase in the interchange fee as the purchase amount increases while preventing the interchange fee calculated from increasing beyond the amount represented by line "CAP."

Figure 3:
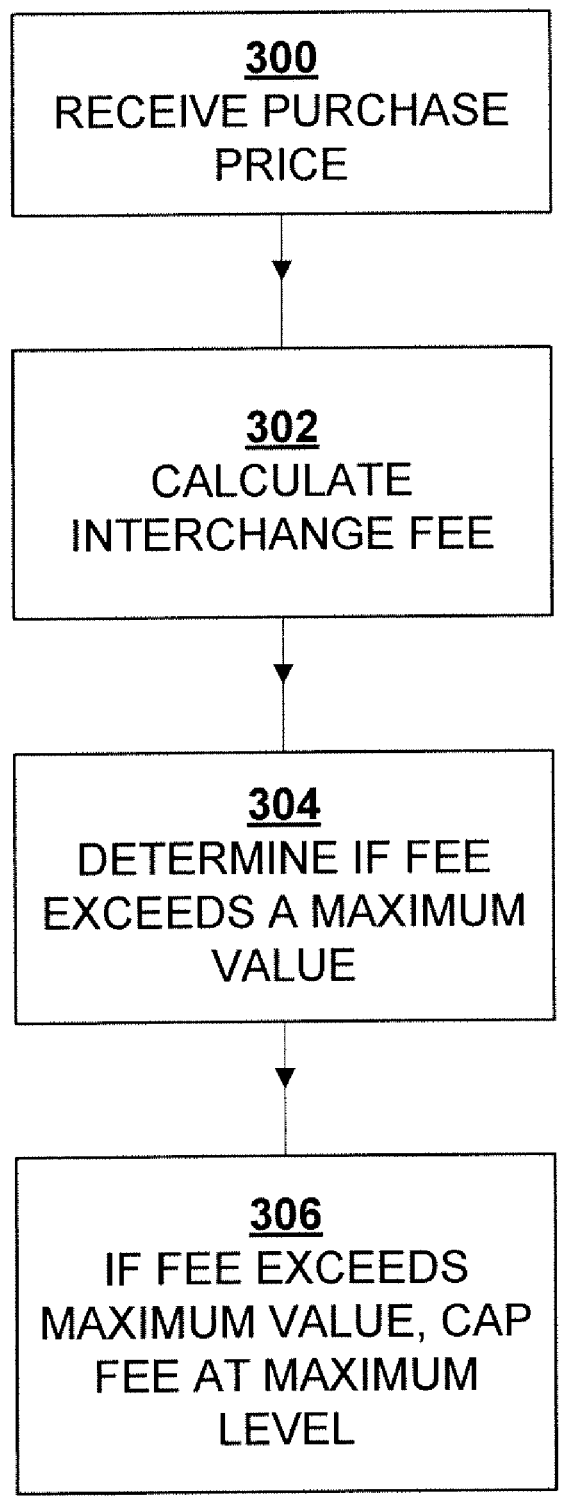
FIG. 3 is a flowchart illustrating an exemplary and non-limiting way to cap an interchange fee.

FIG. 3 is illustrative of an exemplary and non-limiting way to cap interchange fees. At step 300, the issuing bank that calculates and assesses the interchange fee receives the purchase amount from the credit card network. At step 302, the interchange fee is calculated. At step 304, the issuing bank determines if the calculated interchange fee exceeds a maximum value established. If the fee exceeds the maximum value, the interchange fee is capped at the maximum value at step 306 and the transaction continues.

Figure 4:
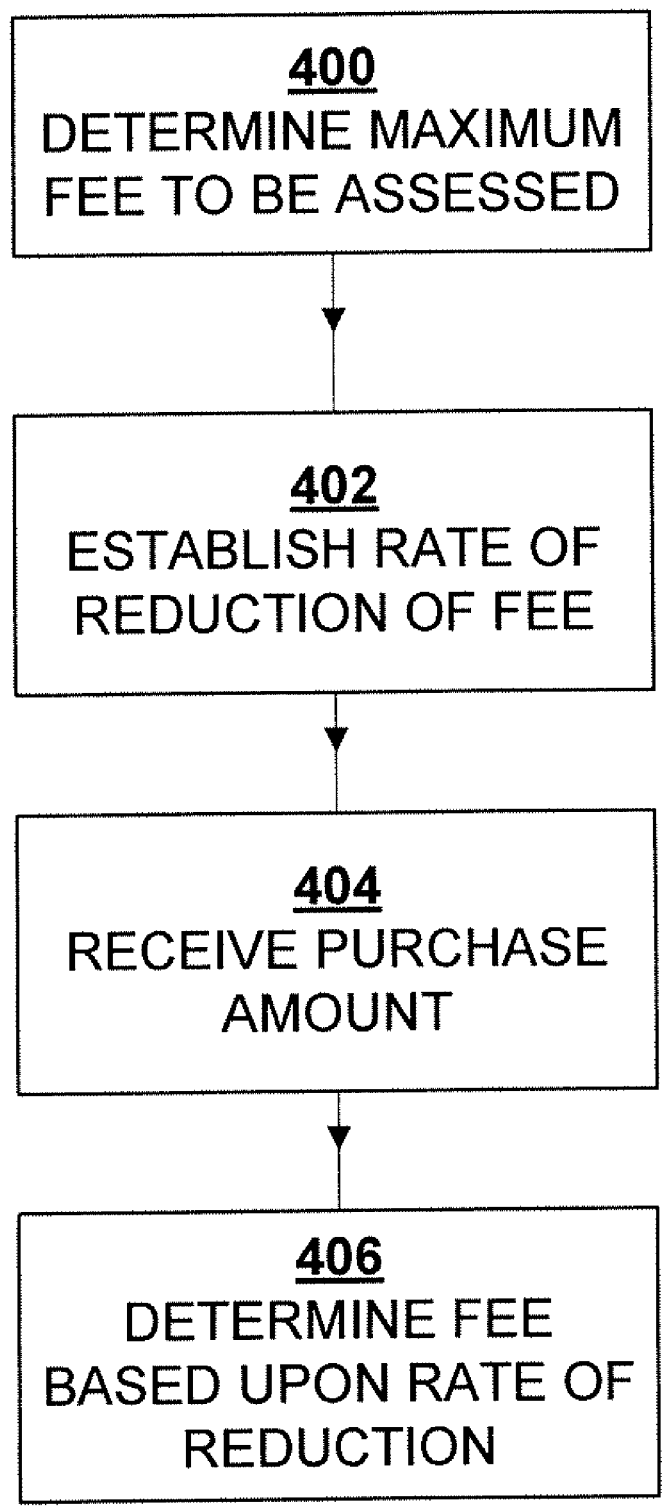
FIG. 4 is a flowchart illustrating another exemplary and non-limiting way to cap an interchange fee.

FIG. 4 is illustrative of another exemplary and non-limiting way to cap interchange fees. At step 400, the maximum fee amount is established and at step 402 a rate of reduction of the interchange fee is determined. The rate of reduction may be similar to the amount illustrated by curve "C" in FIG. 2 above. Once the rate is determined, the issuing bank then receives a purchase at step 404 and determines the interchange fee at step 406 based upon the rate of reduction. Because the rate of reduction curve approaches but does not intersect with the maximum interchange fee amount, a determination of whether or not the interchange fee exceeds the maximum amount should normally not need to be made.

Figure 5:
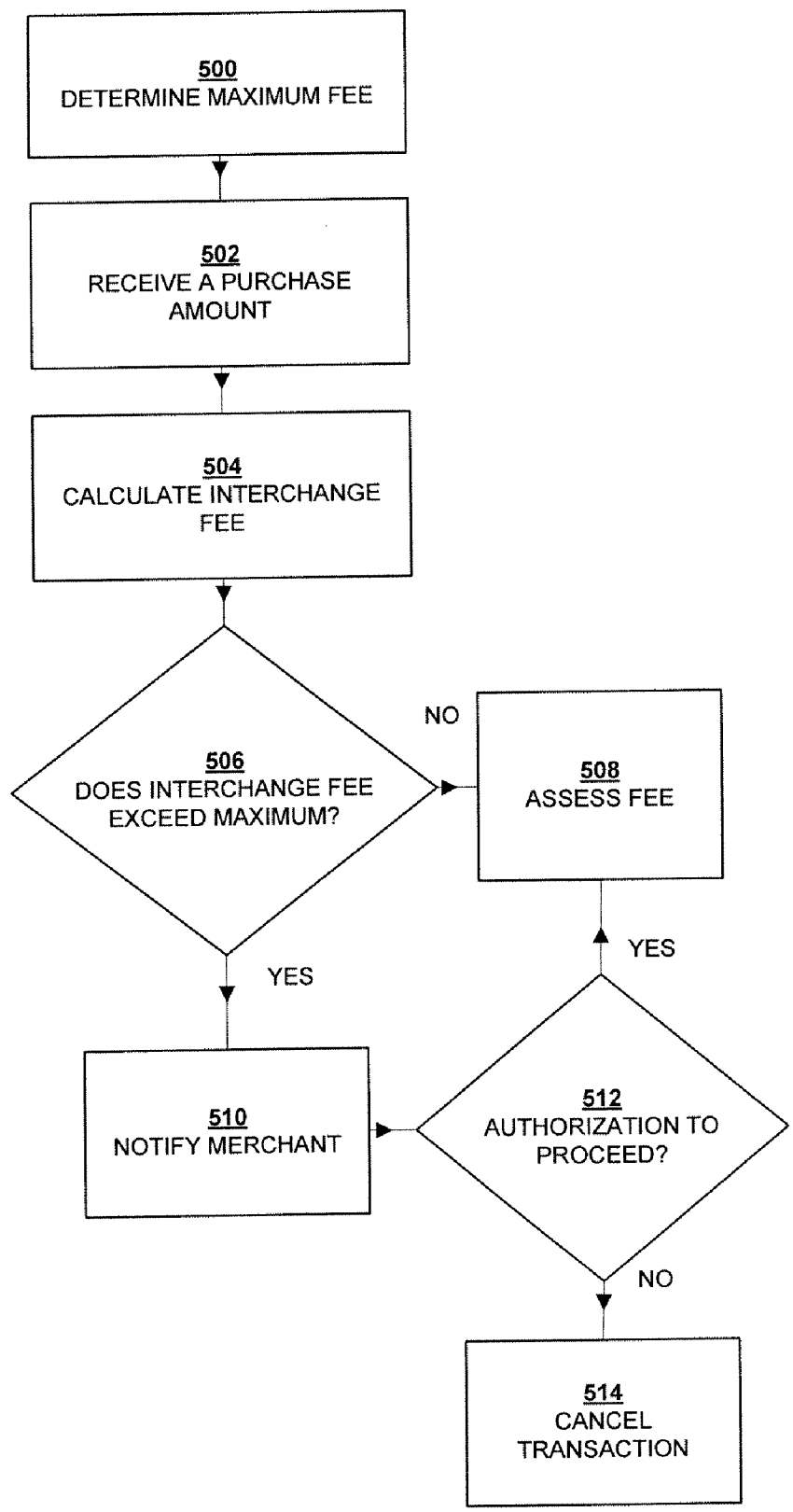
FIG. 5 is a flowchart illustrating another exemplary and non-limiting way to cap an interchange fee.

Instead of automatically capping the interchange fee by the issuing bank, the merchant may have a set maximum at which it would be willing to be assessed. To proceed with the transaction, the merchant will need to give permission to proceed, thus accepting the assessed interchange fee. FIG. 5 is illustrative of an exemplary and non-limiting way of capping an interchange fee in which the merchant controls the cap. At step 500, a maximum fee is determined. Although an issuing bank may determine this amount according to various methods including those described with regards to the above figures, the merchant may also inform the issuing bank that a maximum interchange fee is to be enforced. The merchant may also wish to pass the costs of the interchange fee directly to the consumer at the time of purchase. If the consumer accepts the interchange fee amount to be added to the price, the merchant may accept the interchange fee.

The issuing bank receives a purchase amount at step 502 and calculates the interchange fee at step 504. The issuing bank may determine the interchange fee according to various methods. A determination is made at step 506 if the interchange fee exceeds an amount established by the merchant. If the amount does not exceed the maximum amount, the interchange fee is assessed at step 508. If the amount does exceed the maximum amount, the merchant is notified that a transaction amount will generate an interchange fee greater than the maximum amount. At step 512, the issuing bank sends a request to the merchant, requesting authorization to proceed with the transaction. If the merchant authorizes the interchange fee amount, the fee is calculated and assessed at step 508. If the merchant does not authorize the interchange fee, at step 514, the transaction is cancelled.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed embodiments. In the case of program code execution on programmable computers, the computer will generally include a processor, a storage medium readable by the processor (including volatile and non-volatile memory and/or storage elements), at least one input device, and at least one output device. One or more programs are implemented in a high-level procedural or object-oriented programming language to communicate with a computer system. However, the program(s) can be implemented in assembly or machine language, if desired. In any case, the language may be a compiled or interpreted language and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder, or the like, the machine becomes an apparatus for practicing the present disclosure. When implemented on a general-purpose processor, the program code combines with the processor to provide a unique apparatus that operates to perform the processing of the disclosed embodiments.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment but rather should be construed in breadth and scope in accordance with the appended claims.

What is claimed:

1. A computer-implemented method of calculating an interchange fee to be assessed on a merchant for a purchase amount, comprising:
    establishing a maximum interchange fee to be assessed, wherein the interchange fee is calculated as a percentage of a purchase amount;
    establishing a rate at which the percentage decreases as the purchase amount increases, wherein the percentage decreases so that an interchange fee calculated from a purchase amount does not exceed the maximum interchange fee;
    receiving the purchase amount; and
    calculating by a computer processor the interchange fee using the purchase amount and the percentage.

2. The method of claim 1, wherein establishing a maximum interchange fee to be assessed comprises sending a request to a credit card issuing bank to establish the maximum interchange fee to be assessed, wherein the request is generated by the merchant.

3. The method of claim 2, further comprising receiving an approval of the request from the credit card issuing bank.

4. The method of claim 1, wherein establishing a maximum fee to be assessed comprises:
    determining a type of good or service for the purchase;
    determining that the type is one of a plurality of types approved for a maximum fee; and
    setting a maximum interchange fee.

5. The method of claim 4, wherein the plurality of types includes one of an emergency service, an emergency good, a necessary service, and a necessary good.

6. The method of claim 1, wherein a credit card issuing bank establishes the maximum interchange fee to be assessed.

7. The method of claim 1, wherein receiving the purchase amount comprises summing all purchase amounts for all purchase amounts received from the merchant over a specified period of time.

8. A system for calculating an interchange fee to be assessed on a merchant for a purchase amount, the system comprising:
    a processor; and
    a computer-readable storage medium including instructions that configure the processor to:
    establish a maximum interchange fee to be assessed, wherein the interchange fee is calculated as a percentage of a purchase amount;

establish a rate at which the percentage decreases as the purchase amount increases, wherein the percentage decreases so that an interchange fee calculated from a purchase amount does not exceed the maximum interchange fee;

receive the purchase amount; and calculate the interchange fee by the computer processor using the purchase amount and the percentage.

9. The system of claim 8, further comprising instructions that configure the processor to send a request to a credit card issuing bank to establish the maximum interchange fee to be assessed, wherein the request is generated by the merchant.

10. The system of claim 9, further comprising instructions that configure the processor to receive an approval of the request from the credit card issuing bank.

11. The system of claim 8, further comprising instructions that configure the processor to:

determine a type of good or service for the purchase;

determine that the type is one of a plurality of types approved for a maximum fee; and set a maximum interchange fee.

12. The system of claim 11, wherein the plurality of types includes one of an emergency service, an emergency good, a necessary service, and a necessary good.

13. The system of claim 8, wherein a credit card issuing bank establishes the maximum interchange fee to be assessed.

14. The system of claim 8, further comprising instructions that configure the processor to sum all purchase amounts for all purchases amounts received from the merchant over a specified period of time.

15. A computer-readable storage medium comprising computer-readable instructions for calculating an interchange fee to be assessed on a merchant for a purchase amount, the computer-readable instructions comprising instructions used by a processor to:

establish a maximum interchange fee to be assessed, wherein the interchange fee is calculated as a percentage of a purchase amount;

establish a rate at which the percentage decreases as the purchase amount increases, wherein the percentage decreases so that an interchange fee calculated from a purchase amount does not exceed the maximum interchange fee;

receive the purchase amount; and calculate the interchange fee using the purchase amount and the percentage.

16. The computer-readable storage medium of claim 15, further comprising computer-readable instructions to send a request to a credit card issuing bank to establish the maximum interchange fee to be assessed, wherein the request is generated by the merchant.

17. The computer-readable storage medium of claim 16, further comprising computer-readable instructions to receive an approval of the request from the credit card issuing bank.

18. The computer-readable storage medium of claim 15, further comprising computer-readable instructions to:

determine a type of good or service for the purchase;

determine that the type is one of a plurality of types approved for a maximum fee; and set a maximum interchange fee.

19. The computer-readable storage medium of claim 18, wherein the plurality of types includes one of an emergency service, an emergency good, a necessary service, and a necessary good.

20. The computer-readable storage medium of claim 15, wherein a credit card issuing bank establishes the maximum interchange fee to be assessed.

21. The computer-readable storage medium of claim 15, further comprising computer-readable instructions to sum all purchase amounts for all purchases amounts received from the merchant over a specified period of time.

* * * * *